United States Patent [19]
Lowell et al.

[11] 3,771,367
[45] Nov. 13, 1973

[54] METHOD OF DETERMINING DESORPTION ISOTHERM CURVE AND OF SCANNING HYSTERESIS

[76] Inventors: Seymour Lowell, 42 Hollow Rd., Albertson; Stewart Karp, 67 Hickory Lane, Roslyn Heights, both of N.Y.

[22] Filed: May 4, 1972

[21] Appl. No.: 250,283

[52] U.S. Cl. ............................................. 73/432 PS
[51] Int. Cl. ........................................ G01n 15/08
[58] Field of Search ................................. 73/432 PS

[56] References Cited
UNITED STATES PATENTS
3,555,912   1/1971   Lowell ............................. 73/432 PS
3,211,007   10/1965  Atkins ............................. 73/432 PS

*Primary Examiner*—Richard C. Queisser
*Assistant Examiner*—Joseph W. Roskos
*Attorney*—Bauer & Amer.

[57] ABSTRACT

As an improvement over the method of our prior U.S. Pat. No. 3,555,912 which uses flowing adsorbate and carrier gases to develop surface measurement data, the within improved method further advances this technique by starting at unity, i.e. pure adsorbate, preparatory to obtaining each data point, to thus reliably permit construction of the desorption isotherm curve. During or subsequent to construction of said desorption curve, having the noted descending character, it is herein contemplated scanning the hysteresis of said curve by measuring at a relative pressure having a contrary relationship to a selected starting point, i.e. an ascending relation.

Similarly, data is obtained in the hysteresis of the ascending adsorption isotherm curve by measuring at a relative pressure having a descending, rather than ascending, relation to a starting point.

2 Claims, 3 Drawing Figures

METHOD OF DETERMINING DESORPTION ISOTHERM CURVE AND OF SCANNING HYSTERESIS

The present invention relates to improvements in obtaining surface measurement data using the technique of exposing said surface to flowing adsorbate and carrier gases, and more particularly to a significantly facilitated method of constructing the desorption isotherm curve for a test powder surface, and for scanning the hysteresis region of said curve as well as that of the adsorption curve which bounds the opposite extent thereof.

It is already well known that gas adsorption can advantageously be used to obtain surface measurement data. For example, assuming that nitrogen is the adsorbate, it is known that one cubic centimeter of this gas at 25°C. at one atmosphere of pressure and further existing as a mono-layer adsorbed to the test powder surface will cover approximately 2.84 square meters of that test surface. The foregoing is the basis of measuring techniques using nitrogen or a similar absorbant to determine the size of powder surfaces that are comprised of billions of particulate material. These techniques are generally disclosed in the patent literature, as for example in the NELSEN et al. U.S. Pat. No. 2,960,870 and LOWELL et al. U.S. Pat. No. 3,555,912.

Heretofore, putting to practice the aforesaid techniques have involved complicated calculations or methods that could not entirely be counted on to provide error-free, accurate data. This is so particularly in relation to construction of the desorption isotherm curve.

Broadly, it is an object to provide a facilitated method of determining the desorption isotherm curve of a test powder sample overcoming the foregoing and other shortcomings of the prior art. More particularly, it is an object to develop surface measurement data using to advantage the technique of exposing the test surface to flowing mixtures of adsorbate and carriers gases, and insuring a high degree of reliability to said data by uniformly starting data measurements at a stable condition of equilibrium between the adsorbate and the test powder surface.

The method of determining the desorption isotherm curve which demonstrates objects and advantages of the present invention contemplates, as a first step, exposing the test surface each time to pure adsorbate, i.e. equilibrium condition or unity, and proceeding therefrom to a progressively diminishing condition of relative pressure, to thereby develop each decreasing or descending data point for the isotherm curve. Starting from unity preparatory to determining each data point has been found to provide surface measurement data which is highly reliable and accurate.

The above brief description, as well as further objects, features and advantages of the present invention, will be more fully appreciated by reference to the following detailed description of a presently preferred, but nonetheless illustrative embodiment of apparatus for practicing the method hereof and of exemplary measurement data, when taken in conjunction with the accompanying drawings, wherein.

Figure 1:
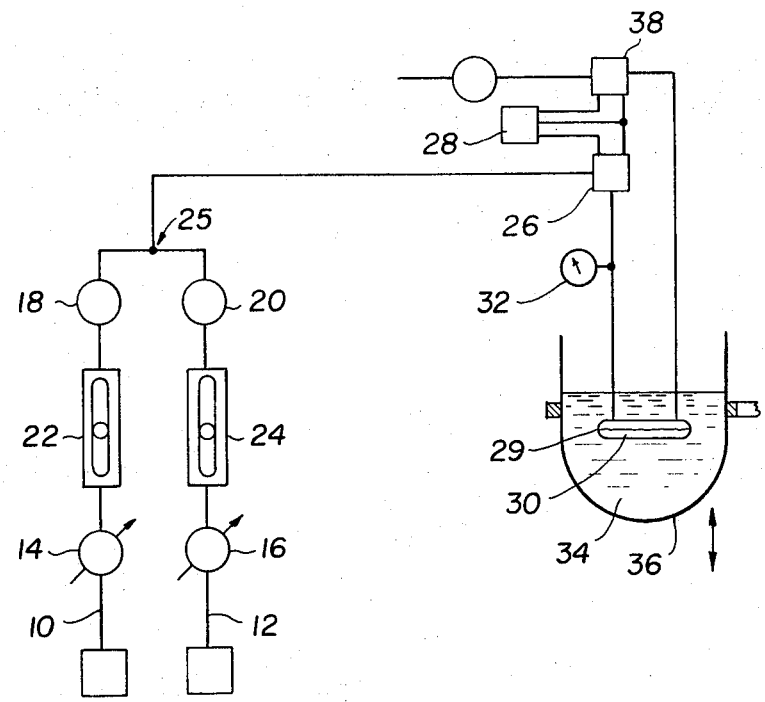
FIG. 1 is a diagrammatic illustration of surface-measurement apparatus.

Reference is now made to FIG. 1 wherein there is shown an exemplary embodiment of apparatus for performing surface measurements with a test powder surface using an adsorbate and carrier gas mixture. For example, assuming that nitrogen is the adsorbate, it is known that one cubic centimeter of this gas at 25°C. at one atmosphere of pressure and further existing as a mono-layer adsorbed to the test powder surface will cover approximately 2.84 square meters of that test surface. The foregoing is the basis of measuring techniques using nitrogen or a similar adsorbant to determine the size of powder surfaces that are comprised of billions of particulate material. These techniques are generally disclosed in the patent literature, as for example in the NELSEN et al. U.S. Pat. No. 2,960,870 and the LOWELL U.S. Pat. No. 3,555,912.

At the inlet or upstream end of the system depicted in FIG. 1, the adsorbate and carrier gases are separately introduced into the lines 10 and 12 respectively. Needle valves 14 and 16 are used to control the individual gas flows while on-off valves 18 and 20 are used to start and stop the gas flows.

Flow meters 22 and 24 in their respective lines 10 and 12 indicate the rates of flow. The gas flows merge at the T-connection 25 and flow as a mixture through the remainder of the system.

The mixture flows initially through detector 26, typically comprising a thermal conductivity cell, which forms part of a conventional wheatstone bridge circuit. This bridge circuit is connected to a suitable measuring device 28, as indicated, which may be a recording potentiometer or the like. After leaving the first detector 26, the gas stream flows through the cell 29 containing a powder sample 30.

It will be noted that a pressure gauge 32 is included in the system. This gauge measures the equilibrium vapor pressure, Po, of the adsorbate. This latter measurement is made by purging the entire system with the adsorbate. Thus, with the sample cell 29 immersed in a coolant 34 (e.g. liquid nitrogen) contained in a flask 36, the pressure is allowed to build up in the system in order to liquify the adsorbate in the sample cell. Subsequently, said pressure is relieved, in any appropriate manner, and the liquid adsorbate will commence to boil, whereby the vapor will flow into the gauge 32. Gauge 32 will then indicate the saturated equilibrium vapor pressure, Po, of the adsorbate. As a result of obtaining the saturated vapor pressure in this manner, much greater accuracy is obtained in determining surface areas.

As indicated in FIG. 1, a conventional detector 38, similar to detector 26, is used to measure the exiting flow rate, and in particular the amount of adsorbate (i.e. nitrogen) desorbed from the powder sample 30.

In a manner which is well understood, and in particular which is described in detail in our prior U.S. Pat. No. 3,555,912 for constructing either the adsorption or desorption isotherm, it is necessary to obtain several data points in order to construct the correct curves. Each data point is obtained with a different nigrogen pressure, this pressure being determined by the appropriate setting of the flow control valves 14 and 16. For a selected gas mixture, measurement is made of the amount of nitrogen adsorbed from said gas mixture and subsequently desorbed from the powder sample 30. The amount of nitrogen desorption is measured using the previously noted recording potentiometer 28 or similar measuring device.

As an example, let certain specific values be considered. Thus, with the sample immersed in the coolant 34, helium gas is used to purge the entire system. Then the flow is adjusted to obtain a relative pressure of nitrogen of 0.1. The system is purged with this new mixture. When the recorder 28 arrives at a constant base line, it is known that the new mixture has flushed out the previous mixture which in the assumed example was pure helium. Removal of the fluid 34 subjects the powder sample 30 with adsorbed nitrogen to ambient temperature of, for example, 25°C., which then results in desorption of the adsorbed nitrogen from the powder sample 30.

Figure 2:
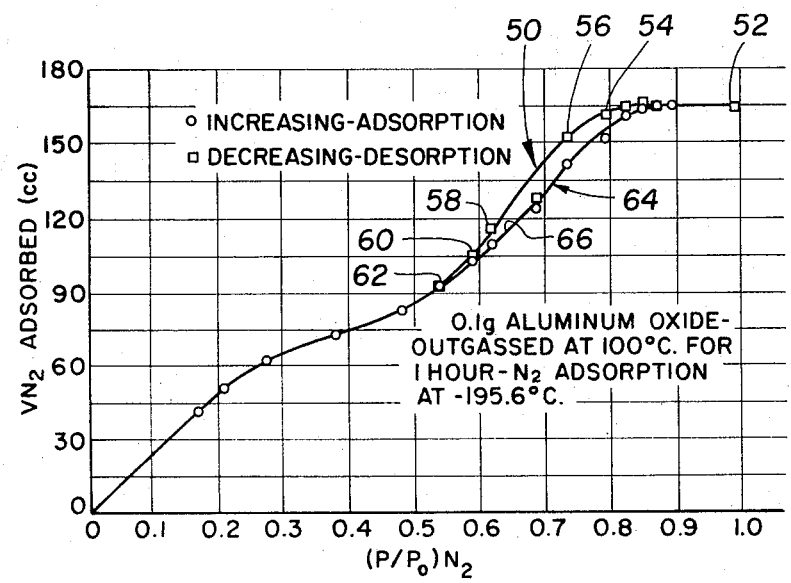
FIG. 2 is a graph depicting a selected isotherm as a function of the amount of adsorbate actually adsorbed throughout a range of relative pressure of the adsorbate from zero to unity.
Figure 3:
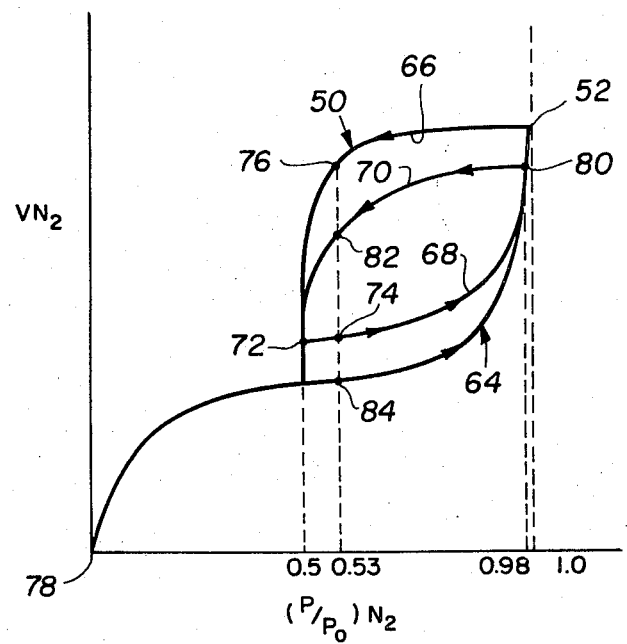
FIG. 3 is a version of the graph of FIG. 2 showing the hysteresis region thereof in exaggerated form to better illustrate the method of scanning said hysteresis region.

In FIG. 2, the adsorption and desorption isotherm curves as derived from the several data points indicated, are illustrated. It will be noted that for the adsorption curve 64 there are ascending pressures, and that starting at approximately a relative pressure of 0.55 the adsorption isotherm curve no longer coincides with the desorption isotherm curve, the gap therebetween representing the hysteresis characteristic of the powder sample 30. Using the apparatus of FIG. 1, in the manner described, it has been generally known how to obtain these ascending values of adsorbed nitrogen at select relative pressures, and thus how to obtain corresponding data points permitting construction of the adsorption isotherm curve. Heretofore, it was not known however that a simplified procedure using the apparatus of FIG. 1 could also advantageously be used to obtain descending values thereof at relative pressures below a relative pressure of 1.0 or unity, to thus obtain the desorption isotherm curve of the test powder sample 30. Additionally, and as perhaps can best be appreciated from FIG. 3 which is an exaggerated version of a typical adsorption-desorption isotherm showing hysteresis, an important contribution of the present invention is the recognition of the character of the adsorption and desorption curves which permit obtaining data points either on these curves or, more important, if desired, in the loop between these curves and thus in the hysteresis portion of the curves. The ability to scan the hysteresis portion of the isotherm curves provides valuable information concerning the behavior characteristics of the powder sample 30.

More particularly, the adsorption curve 64 is, of course, of an ascending character while the desorption curve 50 is, of course, of a descending character. It has been determined that from any selected relative pressure which is on either the adsorption or on the desorption curves, if the next measurement point bears a converse relation, i.e. descending on the ascending adsorption curve and ascending on the descending desorption curve, this successive point of measurement will fall in the hysteresis portion of the isotherm. On the other hand, if the successive measuring point bears a continuing relationship to the starting point, i.e. ascending on the ascending adsorption curve and descending on the descending desorption curve, then that successive measuring point will fall on either said adsorption or desorption curves, and specifically will not fall in the hysteresis portion of the isotherm.

IMPROVED METHOD OF DETERMINING THE DESORPTION ISOTHERM CURVE

Using nitrogen as a preferred adsorbate and the nitrogen-measuring apparatus of FIG. 1 in the manner already generally described, it is readily possible in a significantly facilitated way to obtain the desorption isotherm curve of FIG. 2, therein generally designated 50. The method contemplates always initiating measurement, which ultimately results in obtaining data points for said curve construction, from one starting point, namely a relative pressure of one or unity, there designated 52. From what has already been described, the practice of this first step of the method thus entails passing pure nitrogen (which has been assumed to be the adsorbate), in adsorbing relation to the test powder sample 30. Completion of the adsorption of the nitrogen with the sample 30 is indicated by a base line signal being displayed by the potentiometer 28, or in other words the attainment of a generated voltage balance between the detectors 26 and 38 which operate the potentiometer 28.

The method hereof contemplates as a second step passing a selected mixture of nitrogen rnd helium, the latter being assumed to be the inert or carrying gas, in adsorbing relation to the powder sample 30, thus flushing cell 29 of the pure nitrogen. For purposes of this description, let it be assumed that the selected mixture is one which provides a mixture having a relative pressure of 0.8, i.e. 80 percent nitrogen and 20 percent helium, and thus will ultimately provide the data point 54 for the desorption curve 50. Completion of the purging by this mixture of the pure nitrogen and of the adsorption of the nitrogen from said mixture by the test powder 30 is again signaled by a base line signal display by the potentiometer 28.

That is, the powder sample 30, which is subjected to the gas mixture, is in equilibrium therewith because the same quantity of nitrogen in the mixture is passing through the inlet detector 26 that is also passing through the outlet detector 38, and thus the detectors 26 and 38 are generating the same voltage. Were this not true, the thermal resistance of one or the other of the detectors 26 and 38 would be out of balance, since nitrogen is known to be a poorer heat conductor than helium and a comparative condition would then be indicated in which the incoming and exiting mixture is either nitrogen-rich or nitrogen-depleted.

Following adsorption of the mixture having a relative pressure of 0.8, flask 29 is removed from the liquid nitrogen coolant 34 and thus subjected to an elevated temperature of, for example, 25°C., a preferred ambient temperature, and will thus result in desorption of the nitrogen from the test powder sample 30. The amount of nitrogen desorbed is measured, and in a well understood manner provides the data point 54.

The next step in the method contemplates repeating the first step, namely subjecting the test powder sample 30 again to pure nitrogen and thus at a relative pressure of unity. Once this is achieved, flask 28 is purged with another selected mixture of nitrogen and helium, but this time at a relative pressure which is not only less than unity, but which is also less than the previously used relative pressure of 0.8. For purposes of the within description, let it be assumed that the selected mixture is one having a relative pressure of 0.72 which, as indicated in FIG. 2, will ultimately provide the data point 56. After completion of the purging using this nitrogen and helium mixture of a decreasing or descending character, as just described, and completing the adsorption of the nitrogen thereof with the test powder sample 30, the method hereof contemplates as the next step measuring the volume of nitrogen desorbed from the test powder sample 30 which, as indicated in FIG. 2, is approximately 150 cubic centimeters.

Successive data points of descending or decreasing character and obtained at relative pressures of decreasing or descending character, as at respective data points 58 and 60, are obtained by repeating the steps of the method already described. In particular, prior to each determination of a data point, one must initiate the effort by starting at a relative pressure or unity, or poing 52, and then proceed to the selected relative pressure which is less than unity and which, as noted in the foregoing description, would provide the successive data points 54, 56, 58 and 60. In this manner, the method hereof represents a significantly facilitated way of determining the desorption isotherm curve 50 of the test powder sample 30.

METHOD OF SCANNING THE HYSTERESIS REGION OF ISOTHERM CURVES

As illustrated in FIG. 2, and as generally understood, above the point of convergence 62 of the desorption curve 50 and of the adsorption curve 64 of a powder sample 30, and also below convergence point 52 of relative pressure of unity for these curves, there is a hysteresis region, generally designated 66. That is, above the convergence point 62, the values of nitrogen adsorbed are greater for a given pressure of nitrogen.

For reasons which are well understood, it is advantageous to be able to scan the hysteresis region 66. Specifically, and as is perhaps best understood from FIG. 3, which illustrates the isotherm curves diagrammatically and in exaggerated form, there is a hysteresis region 66 between the desorption curve 50 and the adsorption curve 64 of the isotherm of a typical powder sample, such as sample 30. The present invention contemplates a simplified scanning method transversely of the hysteresis region 66 proceeding either from the desorption curve 50 to the adsorption curve 64, and thus along the scanning curve 68, and also scanning in the reverse direction, as along the scanning curve 70.

Using scanning curve 68 as an example of the scanning method hereof, the same includes as a first step exposing the test sample 30 to a pure nitrogen atmosphere and completing adsorption of the nitrogen to the test sample 30, and thus providing the starting point 52.

Next, the pure nitrogen is purged by a selected mixture of nitrogen and helium at a relative pressure of less than unity, as for example a relative pressure of 0.5 which would provide a point location, as at 72, along the desorption curve 50.

Next, the method contemplates the selection of a mixture of nitrogen and helium which is of a relative pressure of an ascending character relative to the point 72 which, in the illustrated example, is at relative pressure of 0.53. When the nitrogen adsorbed on the test sample 30 at the relative pressure of 0.53 is subsequently desorbed, the volume thereof provides data point 74 on the scanning curve 68, and specifically not data point 76 on the desorption curve 50 which is theoretically at the same relative pressure of 0.53. The reason for this is that the desorption curve 50 is one which is constructed from successive data points that are of descending or decreasing character relative not only to the starting point of unity, but also to each prior point. Thus, since data point 74 is of an ascending relation to starting data point 72, the location thereof is in the hysteresis region 66 of the curve 50 rather than at point 76. Stated another way, location 76 would require movement in the "wrong direction" along the desorption curve 50.

In similar fashion, scanning can be achieved along the scan line 70 by proceeding in a contrary direction to the ascending character of the adsorption curve 50 in regard to a starting point and subsequent relative pressure point. For example, starting with a clean test sample 30, or at point 78, the scanning method hereof contemplates passing a mixture of nitrogen and helium having a relative pressure of 0.98 in adsorbing relation with the powder sample 30 and thus arriving at reference point 80 along the ascending adsorption curve 64. Next assume that the aforesaid mixture is purged by a mixture of nitrogen and helium having a relative pressure of a descending character, or namely a relative pressure of 0.53. The volume of nitrogen subsequently desorbed will provide the scan point 82 of the scan curve 70, rather than point 74 on the adsorption curve 64.

Again, the reason that scanning point 82 is obtained rather than adsorption data point 74 is that point 82 is of a descending character relative to starting point 80 and thus occurs within the hysteresis region 66. Point 84 is not obtained since this would require movement in a reverse direction relative to the ascending character of the adsorption curve 64.

From the foregoing description, it should be readily appreciated that there has been described herein a significant and facilitated method of constructing the desorption isotherm curve for a test powder surface, and also of scanning the hysteresis region of such curve and also of the cooperating adsorption curve which bounds the opposite extent of the hysteresis region.

A latitude of modification, change and substitution is intended in the foregoing disclosure, and in some instances some steps of the inventive method hereof will be employed without a corresponding use of other steps. Also, it is not intended that the adsorbate be limited to nitrogem or that the carrier or inert gas be limited to helium.

The adsorbate must be a gas which does not react chemically with the solid to be measured or any part of the apparatus, and it must be stable at the temperature employed. The diluent or carrier gas may be any chemically inert material which will not adsorb to any appreciable extent on the test surface at the lowest temperature used in the determination. For any given adsorbant, it is recommended to choose a diluent having a critical temperature below, and more preferably at least 40°C. below, the boiling point of the adsorbate. A few of the possible materials which may be used as adsorbates are nitrogen, carbon monoxide, ethelyne, carbon dioxide and various hydrocarbon gases. Suitable diluents are helium, neon, other rare gases, and hydrogen.

What is claimed is:

1. An improved method of using selected adsorbates and inert gas mixtures to determine the desorption isotherm curve of a test powder surface preparatory to determining characteristics of said surface, said method including a first step of establishing a reference starting point by passing only 100 percent pure adsorbate in adsorbing relation to said test powder surface until conclusion of the adsorption of said adsorbate to said surface, a second step of passing a selected mixture of less than 100 percent adsorbate and a remaining percentage of an inert gas in adsorbing relation to said test powder surface until conclusion of the adsorption of said adsorbate to said surface, a third step of determining a data point for said isotherm curve as a function of the amount of adsorbate desorbed as a consequence of said second step, a succeeding step of sequentially repeating said first step and second step hereof, the atter with a selected mixture of a lesser percentage of adsorbate and greater percentage of inert gas than previously used, and a succeeding step after each said sequential repeat of said first and second steps of repeating said third step hereof to determine an additional data point for said isotherm curve, whereby desorption isotherm curve date points are determined which each are of a descending character relative to said established starting point determined using only said 100 percent adsorbate.

2. A method of scanning the hysteresis region of said desorption isotherm curve of claim 1 comprising the steps of passing a selected mixture of an adsorbate gas and an inert gas having a corresponding relative pressure in an ascending relation to a prior-used mixture thereof in adsorbing relation to said test powder surface until conclusion of the adsorption of said adsorbate to said surface, and measuring the amount of adsorbate desorbed from said test powder surface to obtain said hysteresis region data point.

* * * * *